US006480211B1

(12) United States Patent
Masri

(10) Patent No.: US 6,480,211 B1
(45) Date of Patent: Nov. 12, 2002

(54) BI-DIRECTIONAL UPDATE OF DISPLAYS IN PORTABLE ELECTRONIC DEVICE

(75) Inventor: Bassam Masri, San Diego, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/360,492

(22) Filed: Jul. 23, 1999

(51) Int. Cl.[7] .............................................. G06F 17/30

(52) U.S. Cl. ........................................ 345/857; 345/864

(58) Field of Search ................................. 345/721, 722, 345/726, 746, 767, 830, 784–787, 856, 857, 858, 859–862, 805, 864; 709/219, 223, 203

(56) References Cited

U.S. PATENT DOCUMENTS

| | | | | | |
|---|---|---|---|---|---|
| 5,537,128 | A | * | 7/1996 | Keene et al. | 345/89 |
| 5,931,904 | A | * | 8/1999 | Banga et al. | 709/217 |
| 6,032,182 | A | * | 2/2000 | Mullen-Schultz | 709/223 |
| 6,072,498 | A | * | 6/2000 | Brittain et al. | 345/428 |
| 6,118,493 | A | * | 9/2000 | Duhault et al. | 348/564 |
| 6,137,793 | A | * | 10/2000 | Gorman et al. | 370/360 |
| 6,239,797 | B1 | * | 5/2001 | Hills et al. | 345/767 |
| 6,240,447 | B1 | * | 5/2001 | Banga et al. | 709/217 |
| 6,275,858 | B1 | * | 8/2001 | Bates et al. | 709/228 |
| 6,314,452 | B1 | * | 11/2001 | Dekel et al. | 709/203 |
| 6,317,781 | B1 | * | 11/2001 | De Boor et al. | 709/217 |
| 6,321,091 | B1 | * | 11/2001 | Holland | 455/456 |

* cited by examiner

*Primary Examiner*—Steven Sax
(74) *Attorney, Agent, or Firm*—Harness, Dickey & Pierce, PLC

(57) ABSTRACT

A visual display system is described that optimizes the apparent visual effect of a particular sequence of screen update process. The system includes at least one input device and a display unit. The input device operates to receive instructions from the operator. The display unit has some screen setup at any instant in time. The display unit is capable of modifying the screen setup in response to the instructions from the input device at a particular rate. The modification is made in such a sequence of updates that it gives visual impressions of the updates running at a higher rate than the particular rate.

26 Claims, 9 Drawing Sheets

BI-DIRECTIONAL UPDATE OF DISPLAYS IN PORTABLE ELECTRONIC DEVICE

TECHNICAL FIELD

The present specification generally relates to portable electronic devices, and particularly, to a video display update system in a electronic device that changes refresh directions.

BACKGROUND

Many portable electronic devices, such as portable communication devices, cellular and cordless telephones, pagers and the like, include miniature visual display screens that display graphical or text data. Often, it is desirable to allow the operator to control and modify the screen setup of the display.

However, existing portable devices are often controlled by relatively slow processors. These can refresh the displays at a relatively slow rate. The slow refresh rate can cause the display to show, temporarily, both the old display items and the new display items. For example, when the operator moves the cursor up to highlight a new controlled area, both the new area and the old area are often highlighted. This effect aggravates the operator's visual perception of the sluggishness of the display.

SUMMARY

The techniques described herein obviate this problem by controlling the processor to update the visual display in different directions. By optimizing the apparent visual effect of a particular sequence of the screen update process, the operator's impression of sluggishness can be obviated without actually increasing the update rate.

In one aspect, the present disclosure involves a visual display system. The system includes at least one input device and a display unit. The input device operates to receive instructions from the operator. The display unit allows some screen setup at a first time. The display unit is capable of modifying the screen setup in response to the instructions from the input device at a particular rate. The direction of updates gives visual impressions of updates running at a higher rate than the particular rate.

The instruction received by the input device can be to scroll the cursor in a first direction. The screen is updated from bottom to top when the instruction is to scroll the cursor down. The screen is updated from top to bottom when the instruction is to scroll the cursor up.

In another aspect, a method for updating a screen setup in a visual display is disclosed. The method includes receiving instructions and modifying the screen setup in response to the received instructions at a particular rate. The modification is made in a sequence of updates that gives visual impressions of the updates running at a higher rate than the particular rate.

In some embodiments, the method also includes updating the screen setup from bottom to top if the instruction is to scroll up, and from top to bottom if the instruction is to scroll down.

In another aspect, a portable communication device, such as a cellular telephone system, is disclosed. The communication device includes at least one input device, a display unit, and communication electronics.

The communication electronics operate to establish a communication link with remote users. The communication electronics are configured to interface with the at least one input device and the display unit is configured to communicate the received instructions, among other information, to the remote users. The communication electronics update the display unit with information about the communication link.

In a further aspect, a portable video game is disclosed. The video game includes at least one input device and a display unit. In one embodiment, the instruction received by the input device is to move the screen setup in a particular direction. The sequence of updates for the screen setup starts from an area near the particular direction indicated by the input device.

The details of one or more embodiments are set forth in the accompanying drawings and the description below. Other embodiments and advantages will become apparent from the following description and drawings, and from the claims.

BRIEF DESCRIPTION OF THE DRAWINGS

These and other aspects will be described in reference to the accompanying drawings wherein.

Like reference numbers and designations in the various drawings indicate like elements.

DETAILED DESCRIPTION

A detailed description of a preferred embodiment of a bi-directional display update technique is herein provided with respect to the figures.

Figure 1:
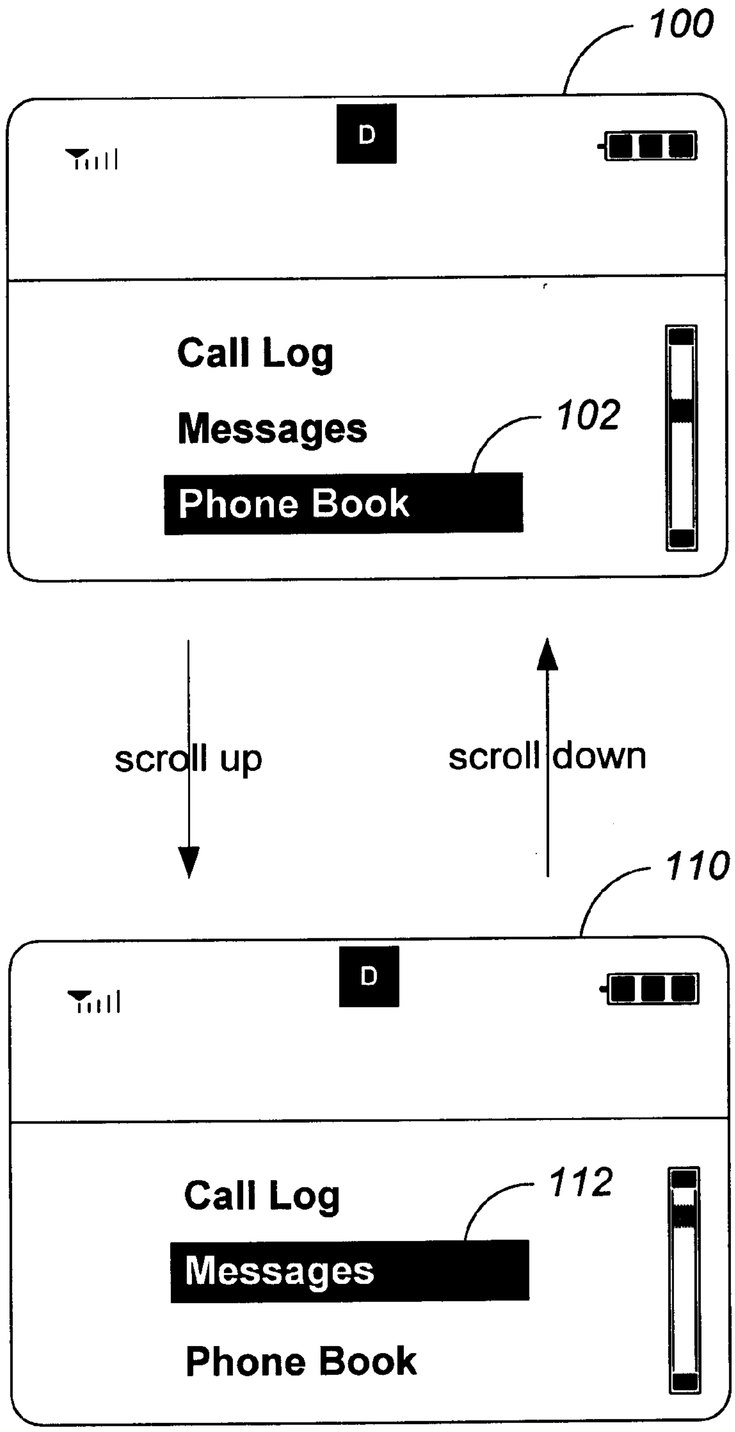
FIG. 1 is an illustration of screen scrolling processes for an ideal visual display.

FIG. 1 illustrates scrolling processes for an ideal visual display. A display screen 100, shown at the top, highlights a controlled area designated as 'Phone Book' 102. Another display screen 110, shown at the bottom, highlights another controlled area designated as 'Messages' 112.

When the operator scrolls the cursor up, the visual display changes from the top screen 100 to the bottom screen 110. The highlighted controlled area is commanded to change from the 'Phone Book' area 102 to the 'Messages' area 112. On the other hand, when the operator scrolls the cursor down, the visual display changes from the bottom screen 110 to the top screen 100. The highlighted controlled area is commanded to change from the 'Messages' area 112 to the 'Phone Book' area 102.

Figure 2:
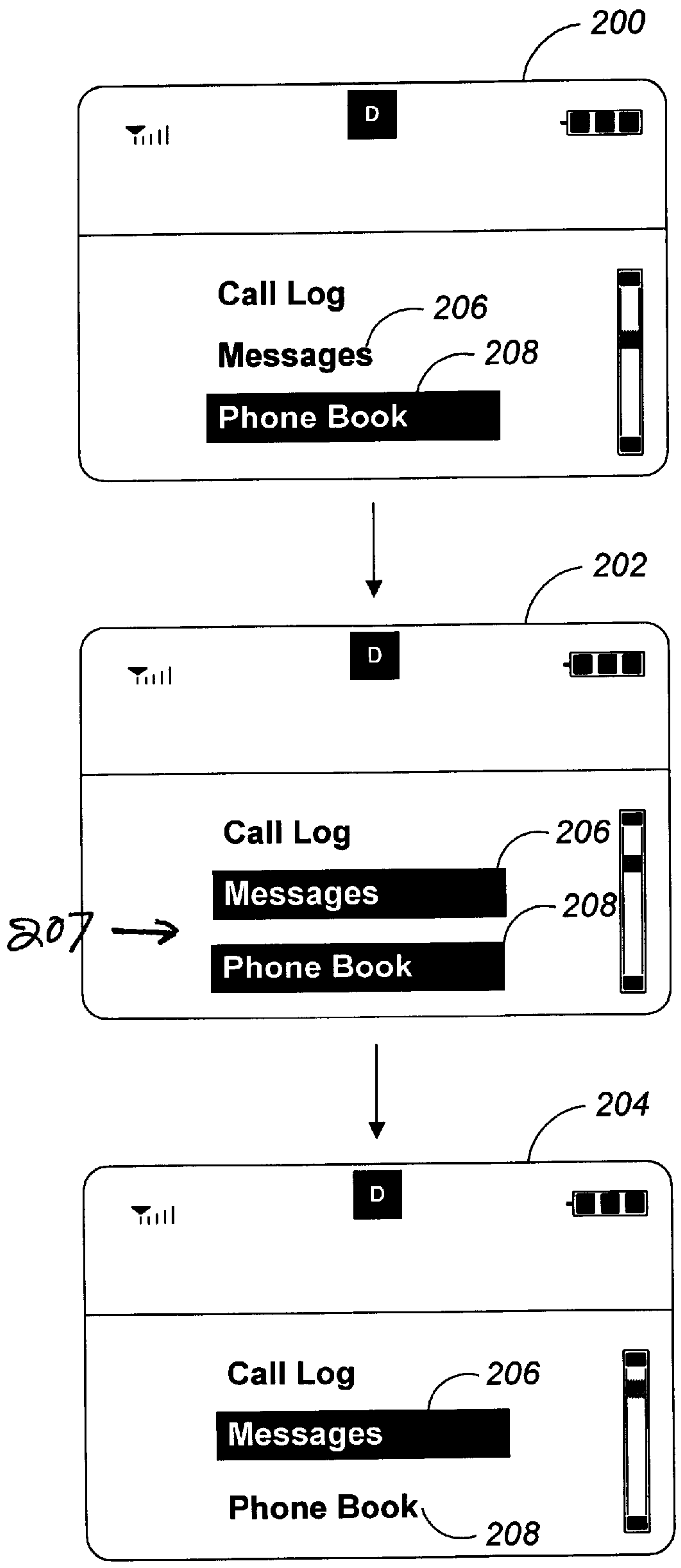
FIG. 2 is a scroll-up process for a visual display system using a conventional top-to-bottom refresh technique.

FIG. 2 shows a scroll-up process for a conventional visual display system using a top-to-bottom refresh technique. The top display 200 shows the initial screen with the 'Phone Book' controlled area 208 highlighted.

When the operator scrolls the cursor up, the refresh software updates the screen, line at a time, from top to bottom. The middle screen 202 shows the intermediate state displayed by the refresh software when the refresh operation has reached the point 207. The middle screen 202 shows the 'Messages' controlled area 206 being updated first with the new 'Messages' area 206 highlighted. However, the 'Phone Book' area 208 is not updated yet and hence the old 'Phone Book' area 208 is still displayed as highlighted. When the 'Phone Book' controlled area 208 is updated, the area 208 is inverted and no longer highlighted. The bottom screen 204 shows this final state of the visual display.

In a slow processor, the middle screen 202 may persist in the intermediate state for a long period of time before updating the rest of the screen. Therefore, the screen 202 shows a cursor shadow in the 'Phone Book' area 208. This gives the user the impression that the display system is slow.

Figure 3:
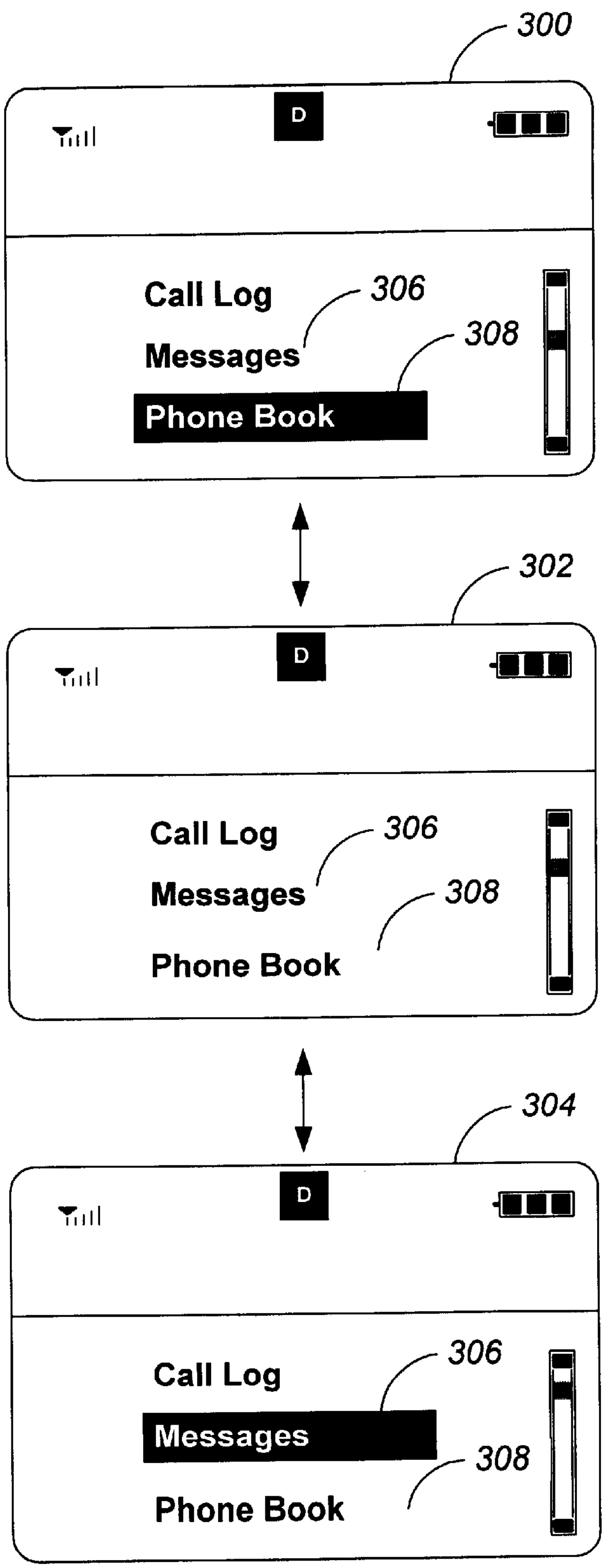
FIG. 3 is an improved scrolling process for a visual display system using a bi-directional refresh technique.

FIG. 3 shows an improved scrolling process for a visual display system with a bi-directional refresh technique. The technique optimizes the apparent visual effect of a particular sequence of the cursor scrolling process without actually increasing the update rate.

The top screen 300 and the bottom screen 304 are the same as in FIG. 2. However, the middle screen 302 displays an intermediate state that optimizes the apparent visual effect.

When the cursor is scrolled up, the screen sequence goes from the top screen 300 to the bottom screen 304. In this case, the refresh software is commanded to update the screen from the bottom up. Therefore, the 'Phone Book' controlled area 308 is updated first and the previously highlighted area is inverted. The middle screen 302, in FIG. 3, no longer displays the unwanted cursor shadow.

When the cursor is scrolled down, the screen sequence is from the bottom screen 304 to the top screen 300. In this case, the refresh software is commanded to update from the top down. Therefore, the 'Messages' controlled area 306 is updated first and the previously highlighted area is inverted. The middle screen 302 again eliminates the unwanted cursor shadow.

Figure 4:
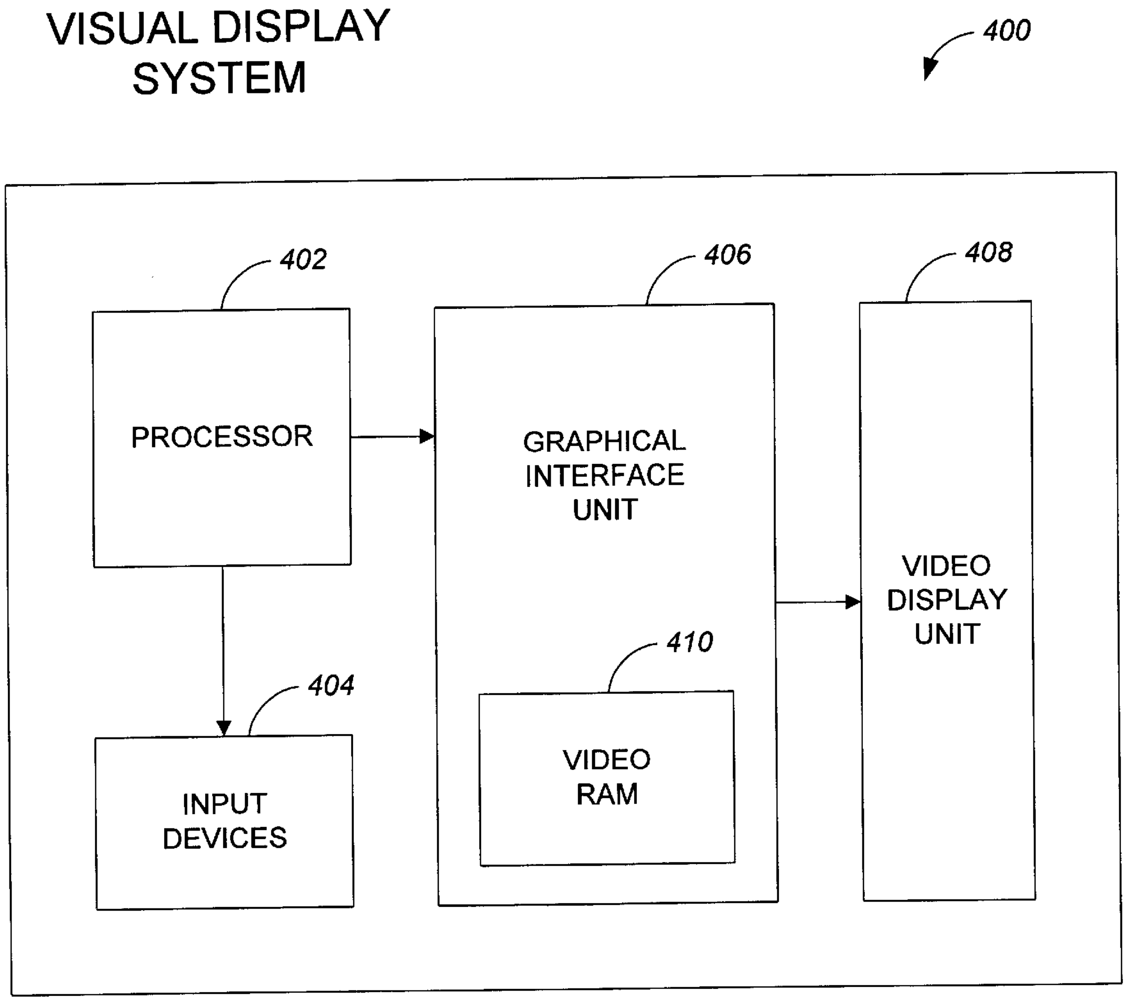
FIG. 4 is a block diagram of the visual display system.

FIG. 4 shows a block diagram of the visual display system 400. The display system 400 includes a processor 402, an input device 404, a graphical interface unit 406, and a video display unit 408.

The processor 402 monitors operator input from the input device 404. Based on the direction of the input, the processor 402 informs the graphical interface unit 406 about the refresh direction of the video display 408 screen. The graphical interface unit 406 updates the video display unit 408 screen using the refresh data stored in the video memory 410. The graphical interface unit 406 recalls the refresh data from the top or the bottom of the video memory 410 according to the direction given by the processor 402.

In some embodiments, the input device 404 may be a keypad, push-button switches, or some combination of switches, buttons, and joysticks. The video display unit 408 may be a liquid-crystal display (LCD) or a cathode-ray tube (CRT) display.

Figure 5:
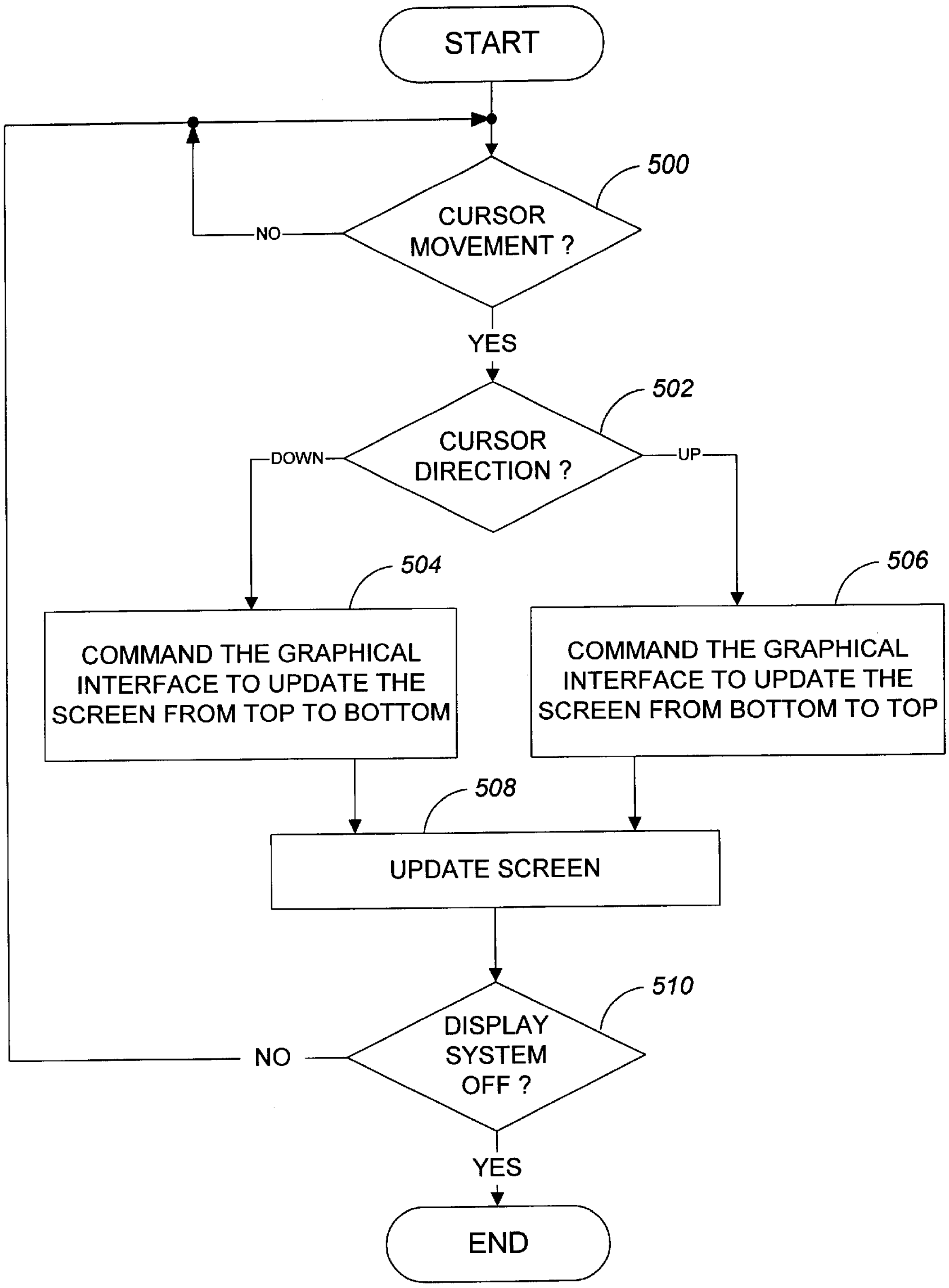
FIG. 5 is a flow diagram of the bi-directional refresh process.

FIG. 5 shows a flow diagram of the bi-directional refresh process. The process may be a computer-implemented method or a computer program residing on a computer-readable medium in the visual display system 400.

The refresh process starts when the processor 402 detects a cursor movement through the input device 404 at step 500. The processor 402 then determines the direction of the cursor at step 502. If the cursor direction is down, the processor 402 commands the graphical interface unit 406 to update the video display 408 from top to bottom at step 504. If the cursor direction is up, the processor 402 commands the graphical interface unit 406 to update the video display 408 from bottom to top at step 506.

The video display screen is updated at step 508 according to the cursor direction determined in step 502. Finally, the processor polls the input device 404 at step 510 to determine if the display system is still on. If so, the input device 404 is again polled for cursor movement. Otherwise, the process is exited.

Figure 6A:
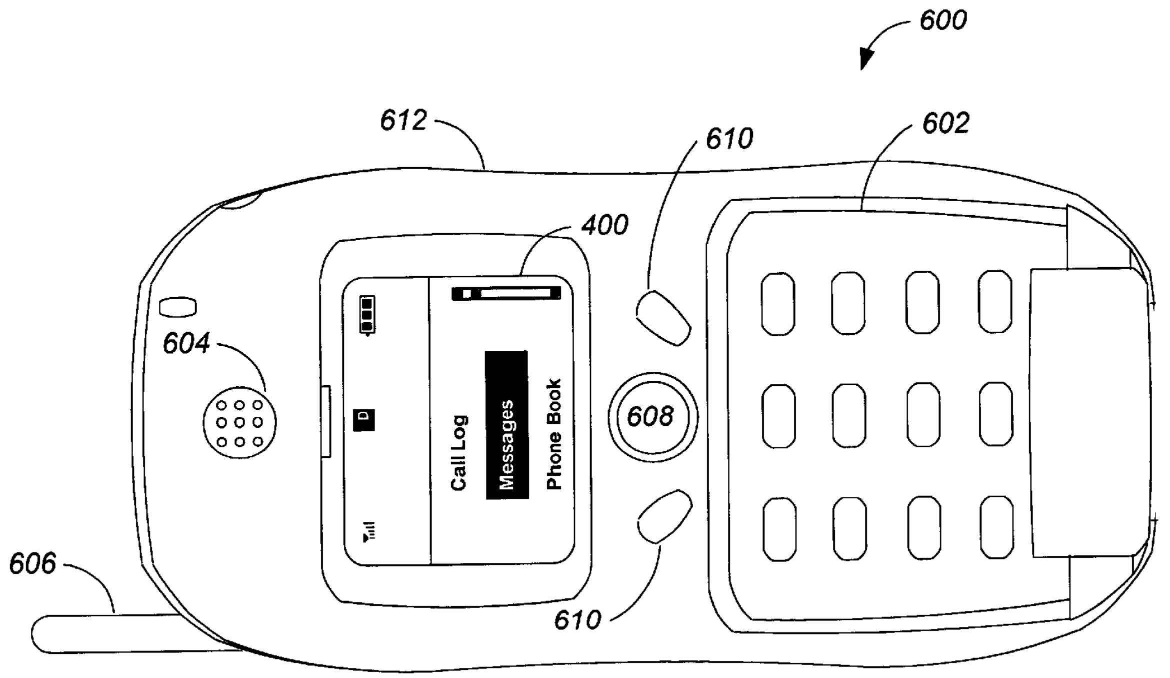
FIG. 6A is a front perspective view of a cellular telephone system using the visual display system.

FIG. 6A shows a front perspective view of a cellular telephone system 600 using the visual display system 400. The cellular telephone system 600 also includes a key pad 602 and various other buttons 610 that are part of the input devices in the display system 400. The telephone system 600 also includes a speaker 604, a microphone 608, an antenna 606, and other communication electronics 614 contained within the telephone housing 612.

Figure 6B:
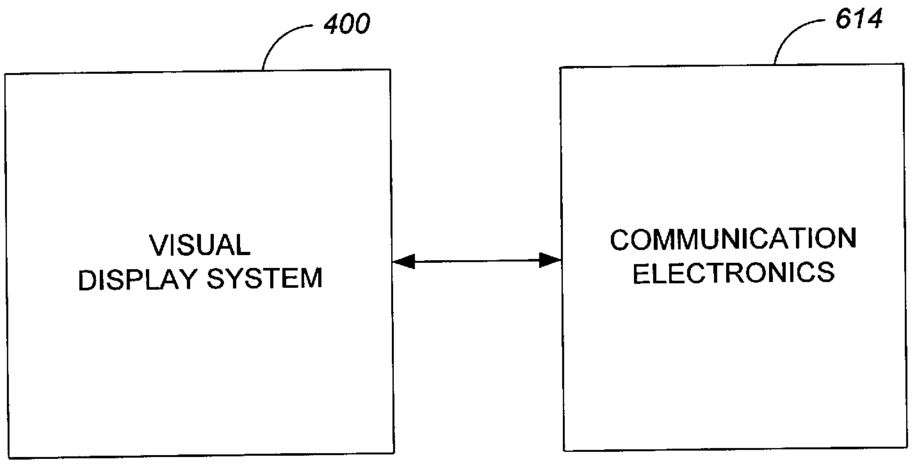
FIG. 6B is a block diagram of the cellular telephone system shown in FIG. 6A.

FIG. 6B shows a block diagram of the cellular telephone system 600 including the communication electronics 614.

Figure 7:
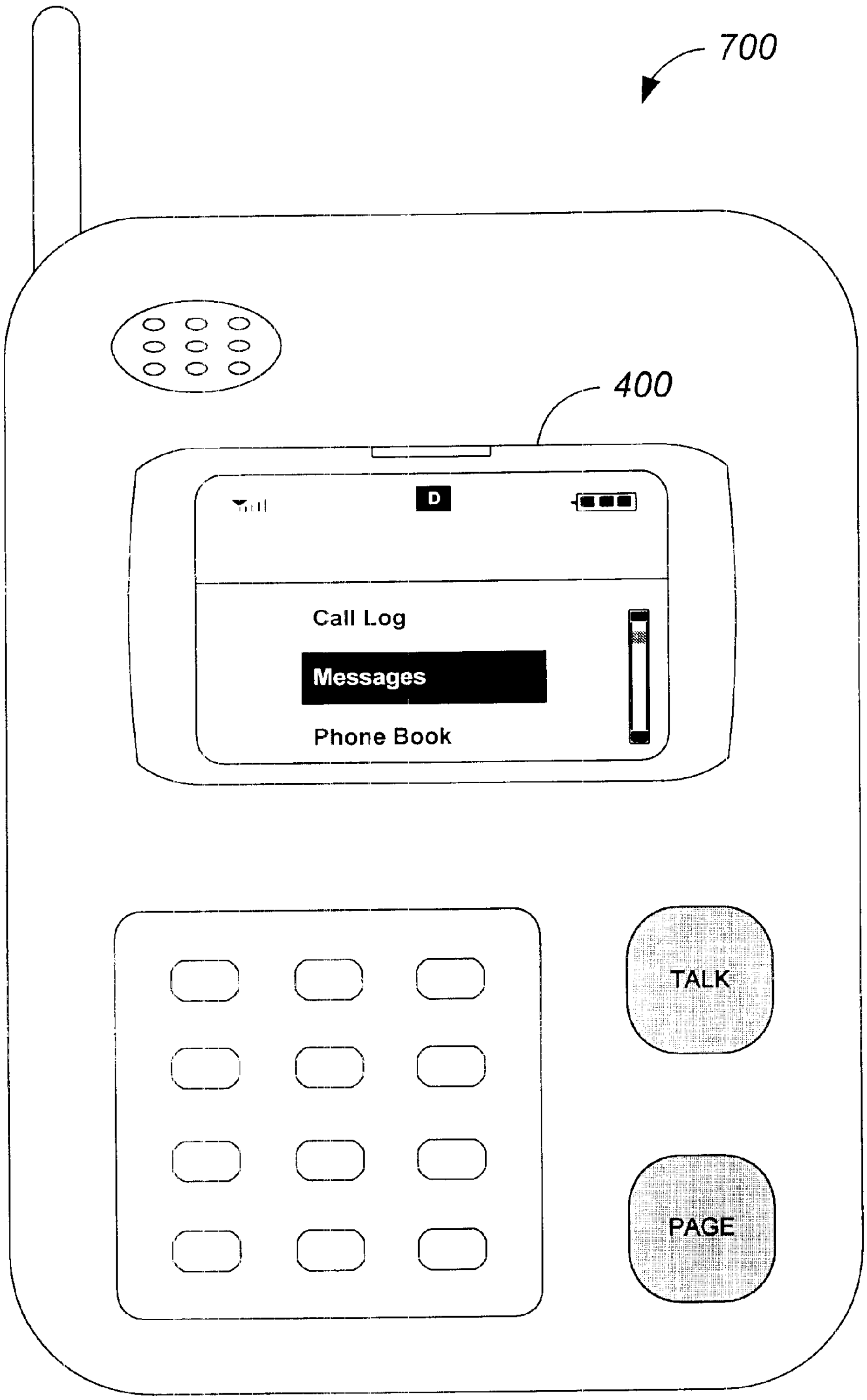
FIG. 7 is a front view of a portable communication device.

FIG. 7 shows a portable communication device 700 including the visual display system 400. The communication device 700 also includes communication electronics similar to those in the cellular telephone system 600.

Figure 8:
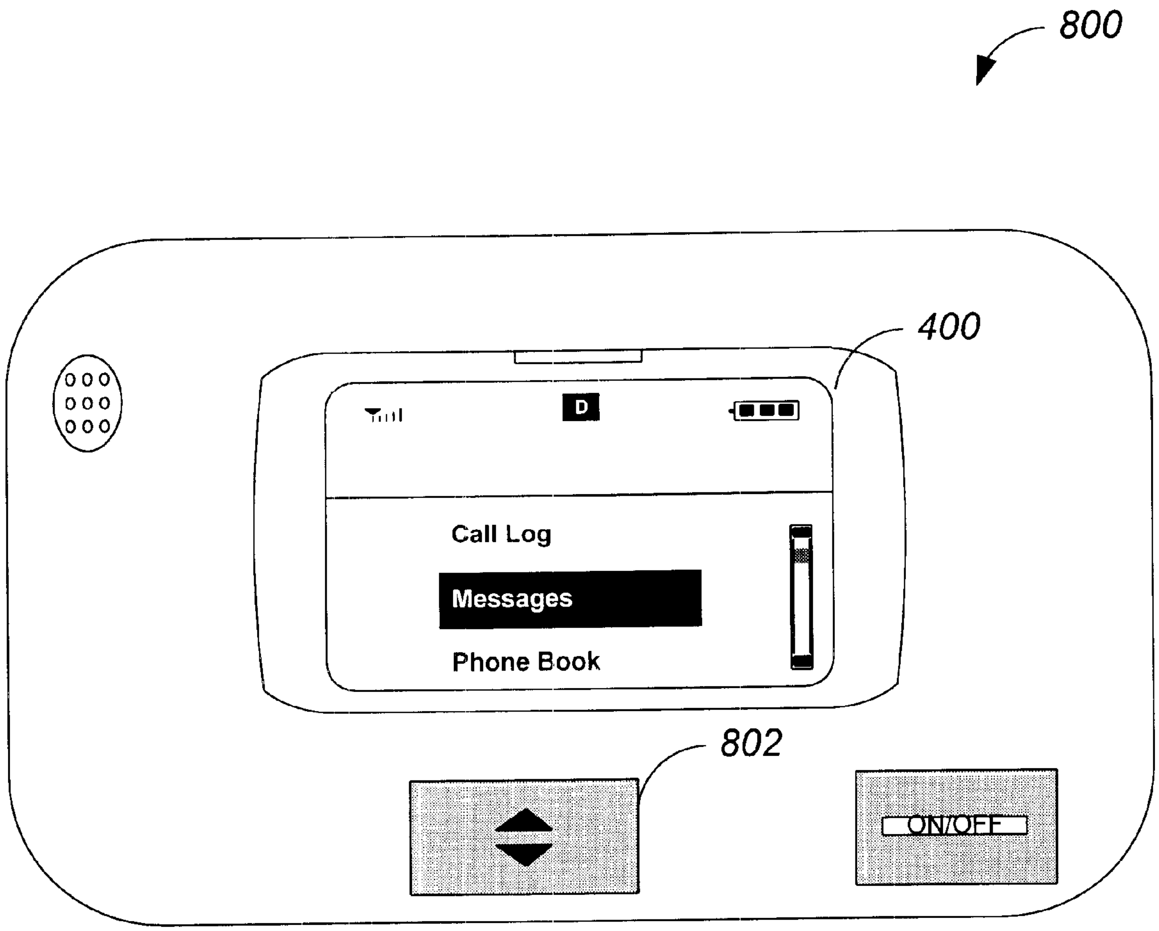
FIG. 8 is a front view of a portable pager system.

FIG. 8 shows a portable pager system 800 including the visual display system 400. The pager system 800 can use up-down buttons 802 as input devices. The pager system 800 also includes communication electronics.

Figure 9:
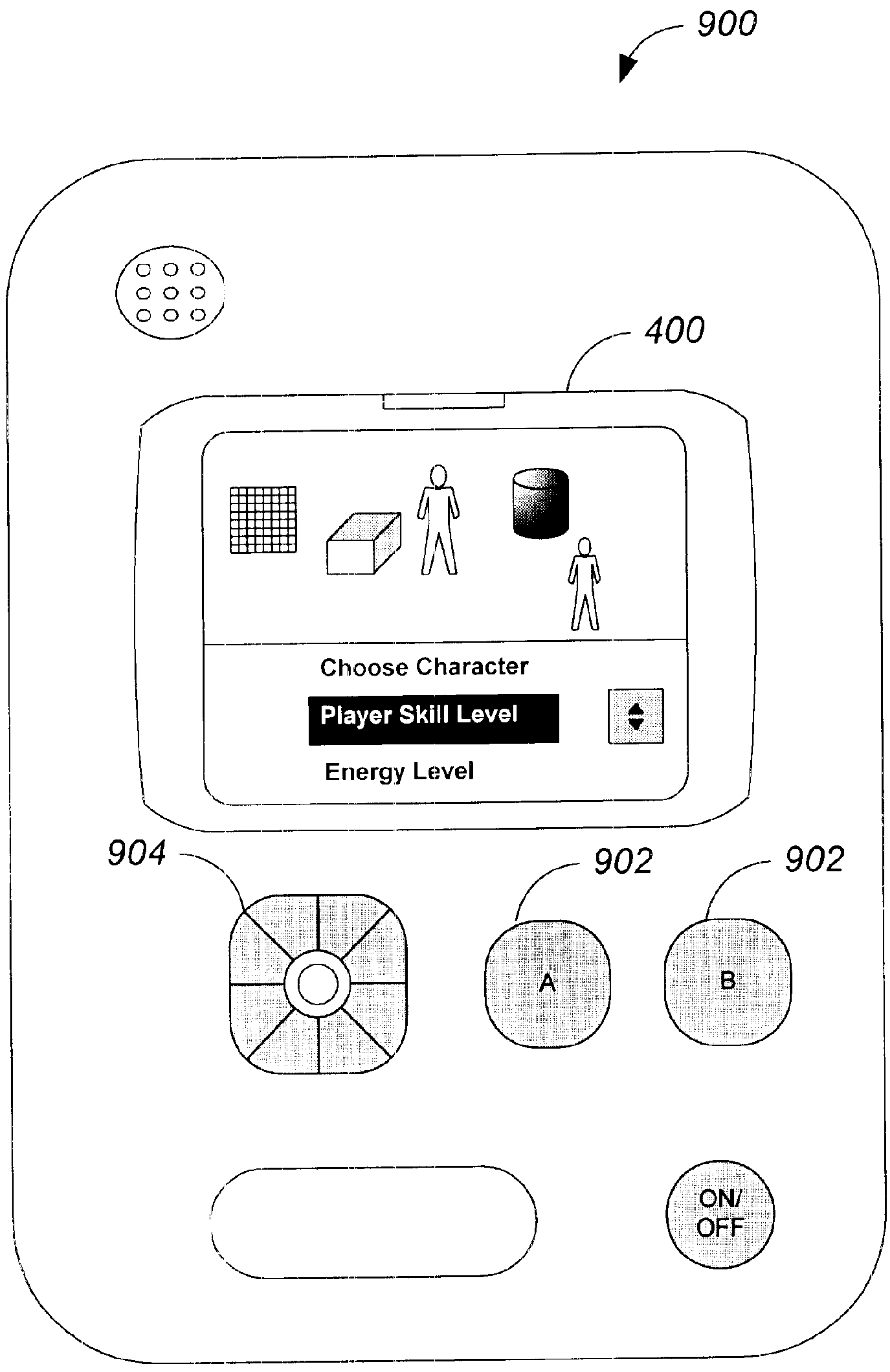
FIG. 9 is a front view of a portable video game using the visual display system.

FIG. 9 shows a portable video game 900 including the visual display system 400. The video game 900 can use push-buttons 902 and joystick buttons 904 as input devices.

The display screen in the video game 900 is updated according to the direction of the input device. For example, if the input device indicates a movement to the right, an area near the right portion of the display screen is updated first, and so on.

Although only a few embodiments have been described in detail above, those of ordinary skill in the art certainly understand that modifications are possible. For example, the bi-directional display update technique is flexible enough to update different controlled area from side to side instead from top to bottom or from bottom to top. In addition, the refresh technique may include other more complex update scheme involving graphical data patterns.

All such modifications are intended to be encompassed within the following claims, in which:

What is claimed is:

1. A portable visual display system comprising:

at least one input device; and a display unit having a screen setup;

a display driver, modifying the screen setup at a particular rate in response to instructions to move a cursor in a desired direction from the at least one input device, where the modification is made by updating the screen setup in a direction determined by the desired direction of cursor movement to give a visual impression of the modification running at a higher rate than the particular rate.

2. The system of claim 1, wherein the sequence of updates for the screen setup is from bottom to top when the instruction is to scroll the cursor up.

3. The system of claim 1, wherein the sequence of updates for the screen setup is from top to bottom when the instruction is to scroll the cursor down.

4. The system of claim 1, wherein the sequence of updates for the screen setup is from the direction of the at least one input device when the cursor is at an edge of the screen setup.

5. The system of claim 4, where the sequence of updates for the screen setup is from bottom to top when the cursor is at a bottom edge of the screen setup and the instruction is to scroll down.

6. The system of claim 4, where the sequence of updates for the screen setup is from top to bottom when the cursor is at a top edge of the screen setup and the instruction is to scroll up.

7. The system of claim 4, where the sequence of updates for the screen setup is from right to left when the cursor is at a right edge of the screen setup and the instruction is to scroll right.

8. The system of claim 4, where the sequence of updates for the screen setup is from left to right when the cursor is at a left edge of the screen setup and the instruction is to scroll left.

9. A portable visual display system capable of receiving instructions from an operator, the system comprising:

at least one input device configured to allow the operator to enter instructions;

a display unit having a particular screen setup at a first time, the screen setup being updated at a second time, such that the screen setup is updated at a particular update rate; and a processor configured to receive the operator instructions to move a cursor in a desired direction from the at least one input device and to generate an update command to the display unit, where the update command refreshes the screen setup according to the operator instructions in a direction determined by the desired direction of cursor movement to give the operator visual impressions of the update rate being higher than actual.

10. The system of claim 9 wherein the screen setup is updated at the second time by scanning from bottom to top when the operator instruction is to scroll the cursor up.

11. The system of claim 9, wherein the screen setup is updated at the second time by scanning from top to bottom when the operator instruction is to scroll the cursor down.

12. The system of claim 9, further comprising:

an interface unit including a memory, the interface unit coupled to the processor and the display unit, and operating to update the screen setup with data from the memory, such that the data are read out in a bottom-to-top order when the operator instruction is to scroll the cursor up.

13. The system of claim 9, further comprising:

a graphical interface unit coupled to the processor and the display unit, and operating to generate visual data for the display unit to update the screen setup of the display unit at the second time according to the update command from the processor; and a memory unit coupled to the graphical interface unit, such that the interface unit generates the visual data by manipulating data stored in the memory unit.

14. The system of claim 9, wherein the at least one input device is a keypad, push-button switches, or some combination of switches, push-buttons, and joysticks.

15. The system of claim 9, wherein the display unit is a liquid-crystal display or a cathode-ray tube display.

16. A method for updating a screen setup in a portable visual display, the method comprising:

receiving instructions to move a cursor in a desired direction; and modifying the screen setup at a particular rate in response to the received instructions, where the modification is made by updating the screen setup in a direction determined by the desired direction of cursor movement to give a visual impression of the updates running at a higher rate than the particular rate.

17. The method of claim 16, wherein the sequence of updates for the screen setup is from bottom to top when the instruction is to scroll the cursor up.

18. The method of claim 16, wherein the sequence of updates for the screen setup is from top to bottom when the instruction is to scroll the cursor down.

19. A method for updating a screen setup of a portable visual display unit, the method comprising:

receiving instructions to scroll a screen cursor in a certain direction; and operating to update the screen setup at a particular rate from bottom to top if the instruction is to scroll up, and operating to update the screen setup at a particular rate from top to bottom if the instruction is to scroll down whereby the screen setup is operated to give a visual impression of updating at a higher rate than the particular rate.

20. A computer program, residing on a computer-readable medium, for use in updating a screen setup of a portable visual display unit, the program comprising executable instructions that enable the computer to:

receive instructions to scroll a screen cursor in a certain direction; and operate to update the screen setup at a particular rate from bottom to top if the instruction is to scroll up, and operate to update the screen setup at a particular rate from top to bottom if the instruction is to scroll down whereby the screen setup is operated to give a visual impression of updating at a higher rate than the particular rate.

21. A cellular telephone system comprising:

at least one input device for receiving instructions;

a portable display unit having some screen setup at any instant in time, the display unit capable of modifying the screen setup at a particular rate in response to the instructions to move a cursor in a desired direction from the at least one input device, where the modification is made by updating the screen setup in a direction determined by the desired direction of cursor movement to give a visual impression of the updates running at a higher rate than the particular rate; and a plurality of communication electronics operating to establish a communication link with remote users, the plurality of communication electronics configured to interface with the at least one input device and the display unit to communicate the received instruction to the remote users, and to update the display unit with information about the communication link.

22. A portable communication device comprising:

at least one input device for receiving instructions;

a display unit having some screen setup at any instant in time, the display unit capable of modifying the screen setup at a particular rate in response to the instructions to move a cursor in a desired direction from the at least one input device, where the modification is made by updating the screen setup in a direction determined by the desired direction of cursor movement to give a visual impression of the updates running at a higher rate than the particular rate; and a plurality of communication electronics operating to establish communication link with remote users, the plurality of communication electronics configured to interface with the at least one input device and the display unit to communicate the received instructions to the remote users, and to update the display unit with information about the communication link.

23. The system of claim 22, wherein the sequence of updates for the screen setup is from bottom to top when the instruction is to scroll the cursor up.

24. The system of claim 21, wherein the sequence of updates for the screen setup is from top to bottom when the instruction is to scroll the cursor down.

25. A portable video game comprising:

at least one input device for receiving instructions; and a display unit having some screen setup at any instant in time, the display unit capable of modifying the screen setup at a particular rate in response to the instructions to move the screen setup in a desired direction from the at least one input device, where the modification is made by updating the screen setup in a direction determined by the desired direction of cursor movement to give a visual impression of the updates running at a higher rate than the particular rate.

26. The system of claim 25, wherein the sequence of updates for the screen setup starts from an area near the particular direction indicated by the input device.

* * * * *